us011961209B2

(12) United States Patent
Chan et al.

(10) Patent No.: US 11,961,209 B2
(45) Date of Patent: Apr. 16, 2024

(54) NOISE TO NOISE ENSEMBLE LEARNING FOR PET AND CT IMAGE AND DATA DENOISING

(71) Applicant: CANON MEDICAL SYSTEMS CORPORATION, Otawara (JP)

(72) Inventors: Chung Chan, Vernon Hills, IL (US); Jian Zhou, Vernon Hills, IL (US); Evren Asma, Vernon Hills, IL (US)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 409 days.

(21) Appl. No.: 17/013,104

(22) Filed: Sep. 4, 2020

(65) Prior Publication Data

US 2021/0118098 A1 Apr. 22, 2021

Related U.S. Application Data

(60) Provisional application No. 62/923,593, filed on Oct. 20, 2019.

(51) Int. Cl.
*G06T 5/00* (2006.01)
*G06N 3/08* (2023.01)

(52) U.S. Cl.
CPC ............ *G06T 5/002* (2013.01); *G06N 3/08* (2013.01); *G06T 2207/10104* (2013.01); *G06T 2207/20081* (2013.01); *G06T 2207/20084* (2013.01)

(58) Field of Classification Search
CPC ......... G06T 5/002; G06T 5/001; G06T 5/003; G06T 5/005; G06T 2207/10104; G06T 2207/10072; G06T 2207/10116; G06T 2207/20081; G06T 2207/20084; G06T 2207/30004; G06N 3/08; G06N 3/02; G06N 3/04; G06N 3/0454
USPC ................ 382/131, 128, 162, 167, 254, 275
See application file for complete search history.

(56) References Cited

U.S. PATENT DOCUMENTS

| | | | |
|---|---|---|---|
| 2018/0240219 A1* | 8/2018 | Mentl | G06N 3/08 |
| 2020/0082197 A1* | 3/2020 | Alletto | G06V 20/56 |
| 2020/0349449 A1* | 11/2020 | Wang | G06V 10/764 |
| 2021/0290191 A1* | 9/2021 | Qi | G06T 5/002 |

FOREIGN PATENT DOCUMENTS

JP 2015-129987 A 7/2015

OTHER PUBLICATIONS

PET Image Denoising Using a Deep Neural Network Through Fine Tuning, by Gong et al. IEEE Transactions on Radiation and Plasma Medical Sciences, vol. 3, No. 2, Mar. 2019 (Year: 2019).*
Chung Chan et al., "Noise Adaptive Deep Convolutional Neural Network for Whole-Body PET Denoising", IEEE, 2018, 4 pages.
Office Action issued Jan. 30, 2024, in corresponding Japanese Patent Application No. 2020-175955, 3 pages.

* cited by examiner

*Primary Examiner* — Vikkram Bali
(74) *Attorney, Agent, or Firm* — Oblon, McClelland, Maier & Neustadt, L.L.P.

(57) ABSTRACT

A system and method for training a neural network to denoise images. One noise realization is paired to an ensemble of training-ready noise realizations, and fed into a neural network for training. Training datasets can also be retrospectively generated based on existing patient studies to increase the number of training datasets.

18 Claims, 12 Drawing Sheets

NOISE TO NOISE ENSEMBLE LEARNING FOR PET AND CT IMAGE AND DATA DENOISING

CROSS REFERENCE TO CO-PENDING APPLICATION

This application claims priority to U.S. Provisional Patent Application No. 62/923,593 filed Oct. 20, 2019, the contents of which are incorporated herein by reference.

FIELD OF THE INVENTION

Embodiments described herein relate generally to a system and method for obtaining a trained artificial neural network to denoise image datasets.

BACKGROUND

Deep learning convolutional neural networks (DCNN) have been applied in medical imaging denoising applications. See (1) [Chen 2017]: H. Chen, et al., 'Low-Dose CT With a Residual Encoder-Decoder Convolutional Neural Network', IEEE TMI, 2017; (2) [Gong 2018a]: K. Gong, et al., 'Iterative PET image reconstruction using convolutional neural network representation', IEEE TMI, 2018; (3) [Chan 2018]: C. Chan, J. Zhou, L. Yang, W. Qi, J. Kolthammer, and E. Asma, "Noise Adaptive Deep Convolutional Neural Network for Whole-Body PET Denoising," in *IEEE NSS/MIC Conference Record,* 2018; and (4) [Gong 2018b]: K. Gong, J. Guan, C. Liu, and J. Qi, "PET Image Denoising Using a Deep Neural Network Through Fine Tuning," *IEEE Transactions on Radiation and Plasma Medical Sciences*, pp. 1-1, 2018. Through training, the network learns to remove noise while preserving the latent clean image.

Training DCNN denoising models usually requires large amounts of paired datasets $(x_i, y_i)$ of corrupted inputs $x_i$ and clean targets $y_i$. The denoising performance depends on both the quality of the targets, and the number of training datasets. Obtaining high quality training targets is often very challenging in medical imaging due to the limitation of radiation exposure and imaging time. High radiation dose PET and CT scans can cause health safety concerns. Long acquisition PET scans are not employed in routine clinical practice. As a result, the number of high quality PET training datasets is very limited. Limited amount of training datasets may lead to poor denoising results and over-fitting.

Prior studies have proposed using synthetic (or noise simulated) training data to train the neural network. See [Gong 2018b]. However, it is a significant challenge to synthesize medical data, due to large variations in both anatomical characteristics and radiotracer distributions caused by physiological changes. Moreover, it is very challenging to simulate real noise properties without sophisticated system modeling. Therefore, training a denoising DCNN for medical data can include major hurdles in practice.

SUMMARY

In light of the above-mentioned problems, a system and method for training an untrained artificial neural network to obtain a trained neural to perform image denoising is described. One corrupted dataset (i.e. noise realization) is mapped to a multi-member set of corrupted datasets for training the artificial neural network. Further, each noise realization can be used in turn as the corrupted dataset. A bootstrap technique can also be used to retrospectively generate training datasets based on existing patient studies. Such techniques can be implemented for denoising medical images including, but not limited to, Positron Emission Tomography (PET) images and Computed Tomography (CT) images.

DETAILED DESCRIPTION

A noise-to-noise-ensemble (N2NEN) training method and system is described herein with reference to the Figures. Instead of using as the training datasets (input, target) pairs of (corrupted image, high quality image), the network is trained by mapping one corrupted dataset to a multi-member set of the corrupted datasets. In one embodiment, all these datasets share the same mean and noise distribution, but are drawn from different noise realizations.

The DCNN loss function minimization $$\operatorname*{argmin}_{\theta} \sum_{i \in N} \psi(\mathcal{F}(x_i; \Theta), y_i) \qquad (1)$$

can be written as $$\operatorname*{argmin}_{\theta} \sum_{i \in N} \sum_{j \in K} \psi(\mathcal{F}(x_i; \Theta), \hat{y}_{ji}) \qquad (2)$$

where N is the total number of corrupted dataset x, K is the total number of the noise realizations of the corrupted dataset $x_i$, $\psi$ is the loss function, $\mathscr{F}$ represents the neural network, $\Theta$ denotes the trainable parameters, both $x_i$ and $\hat{y}_{ji}$ are drawn from the same noise distribution. This training scheme can be applied in both image domain and sinogram domain. In one embodiment, the datasets have the same mean and distribution, but in an alternate embodiment the datasets may have different means and distributions.

In one embodiment, this technique can be used in denoising PET images. In another embodiment, this technique can be used to denoise other image-types, such as computed tomography (CT) images and X-Ray, Ultrasound and MRI.

Figure 1:
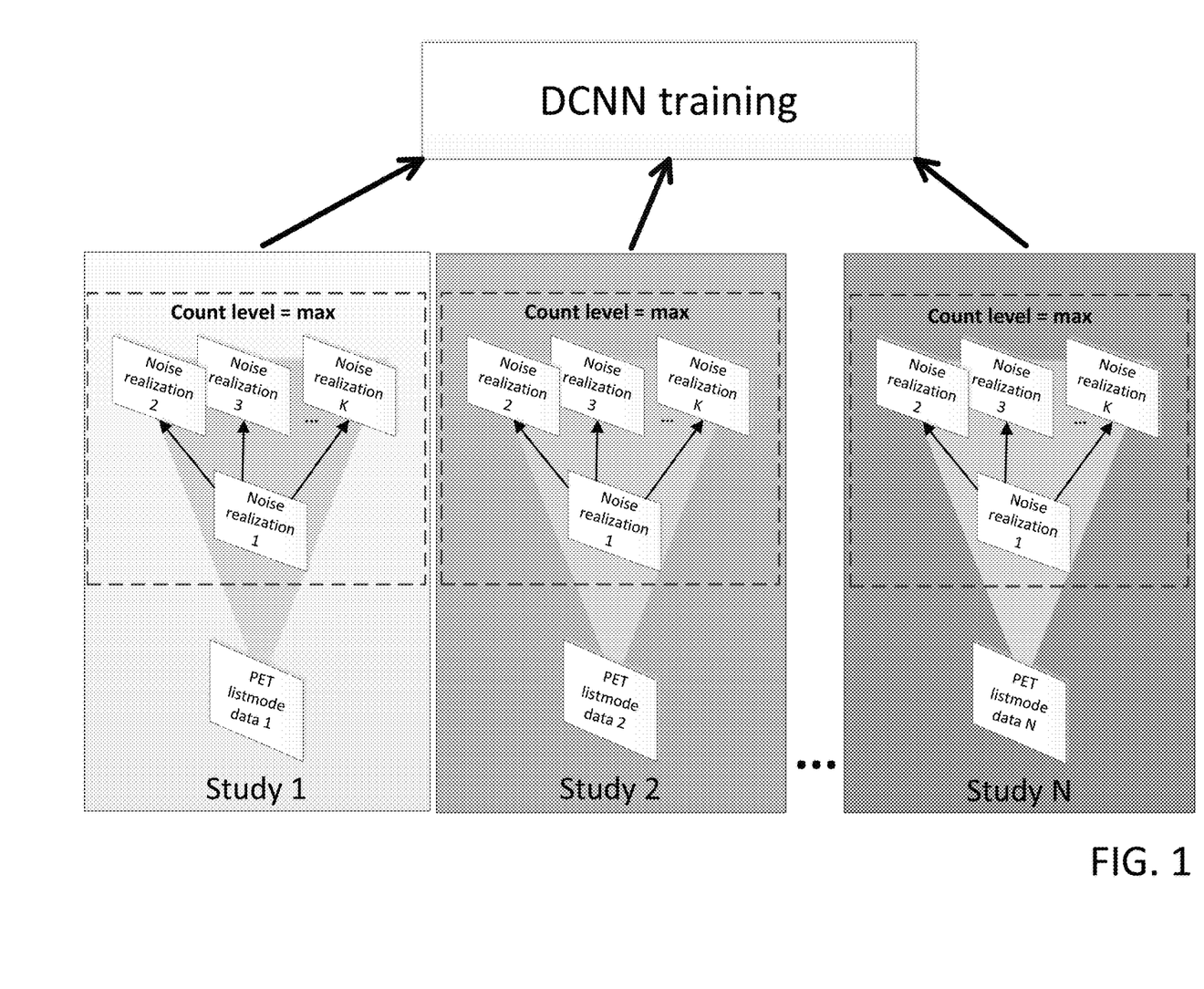
FIG. 1 shows a workflow of N2NEN training, where, for each of N studies, one of the noise realizations is used as the corrupted dataset, and all other noise realizations are used as targets for a single, maximum count level per study.

As an example, PET image denoising is used. In one embodiment, FIG. 1 illustrates the general workflow of N2NEN training with N patient studies initially represented by raw listmode data that represents a maximum count level for each of the N patient studies. In one embodiment, the maximum count level is normalized or made the same across all N studies. In alternate embodiments, the count levels vary across the N-studies. The data of each study is split into K noise realizations where K>=2. N2NEN pairs one noise realization in the maximum count level to multiple noise realizations at the same maximum count level. As shown in FIG. 1, noise realization 1 is used as a corrupted data set, and each of the other noise realizations 2 through K are used separately as targets. This produces a set of K−1 pairs. As used herein, the function Pairs(input$_x$, [targets]) will be used as a shorthand for the process of creating all the possible pairings of input$_x$ with all the different members of the set [targets]. So, the above-noted pairings of noise realization 1 as a corrupted data set, with each of the other noise realizations 2 through K can be represented as Pairs(1, [2 . . . K]). where [2 . . . K] uses the " . . . " notation to represent the set of all entries from 2 to K. Likewise, the set notation can include breaks in the set such as [1 . . . 2, 4 . . . K] which signifies all elements from 1 to K except 3.

As noted above, in FIG. 1, the data of each study is split into K noise realizations. In some embodiments, the noise realizations are generated such that they are any of: substantially independent and identically distributed (i.e., having correlation factors of 0.05); nearly independent and identically distributed (i.e., having correlation factors of 0.02); virtually independent and identically distributed (i.e., having correlation factors of 0.01); and completely independent and identically distributed (i.e., having correlation factors of 0.0). The collective team for such noise realizations generated from the same original data will be referred to herein as "training-ready" noise realizations.

Figure 2A:
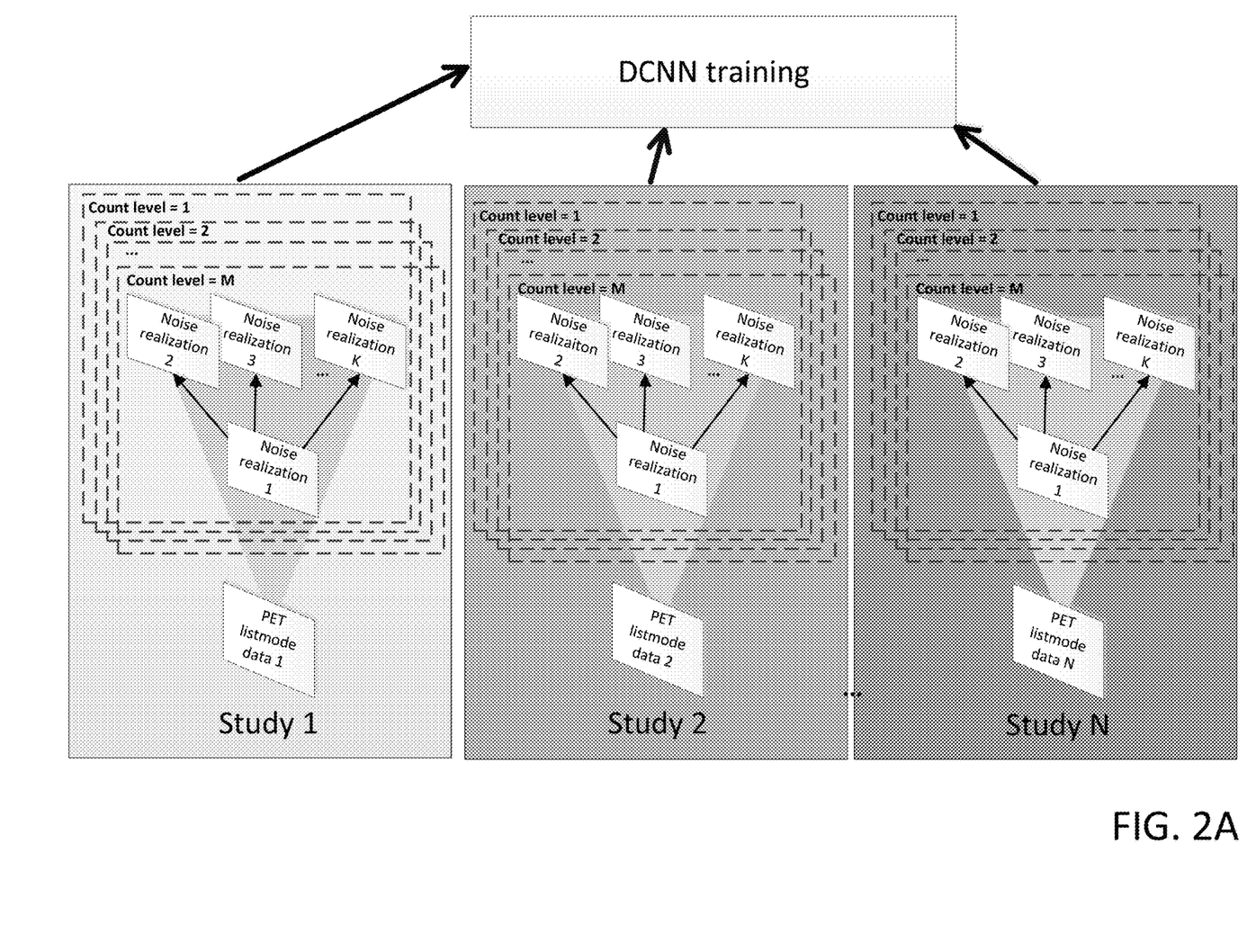
FIG. 2A shows a workflow of N2NEN training, where, for each of N studies, one of the noise realizations is used as the corrupted dataset, and all other noise realizations are used as targets, but each study is split into plural count levels for additional network training and robustness.
Figure 2B:
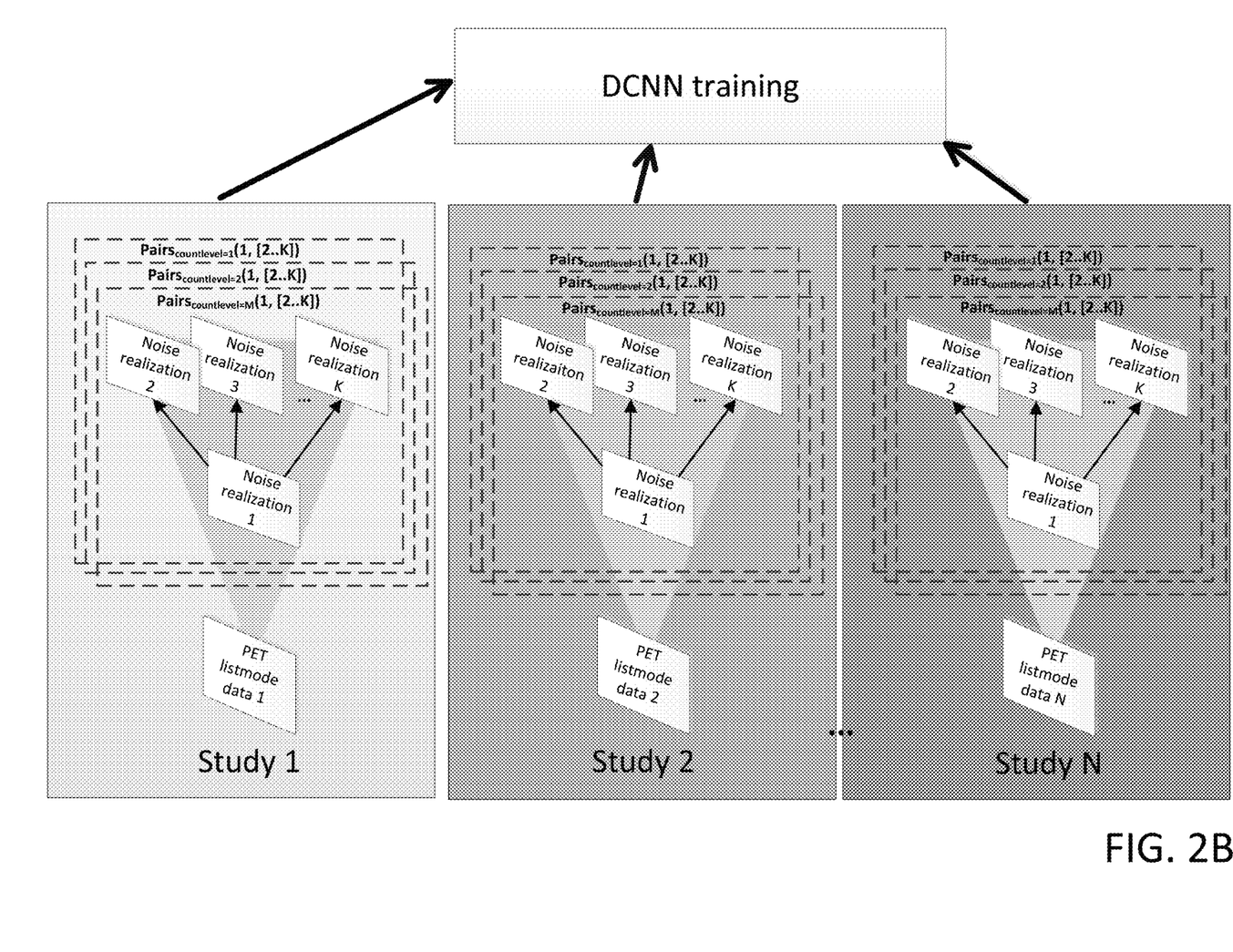
FIG. 2B is an alternate representation of FIG. 2A and shows a workflow of N2NEN training, where, for each of N studies, each with plural count levels.

Another example is shown in shown in FIGS. 2A and 2B. Raw listmode data is rebinned (down-sampled) into M count levels, and for each count level, K noise realizations are generated. In training, for each count level, one of the training noise realizations (e.g., one of the substantially independent and identically distributed noise realizations) of each study is used as the corrupted dataset, and all other noise realizations (of the corresponding substantially independent and identically distributed noise realizations) are used as targets (according to Pairs(1, [2 . . . K])). Alternatively, in training, for each count level, one of the training noise realizations (e.g., one of the completely independent and identically distributed noise realizations) is used as the corrupted dataset, and all other noise realizations (of the corresponding completely independent and identically distributed noise realizations) are used as targets. FIG. 2A shows a graphical representation of the Pairs(1, [2 . . . K]) for one of the count levels for each of the N studies. As used herein, the nomenclature Pairs$_{countlevel=1}$ (input$_x$, [targets]) will be used as a shorthand for the process of creating the pairings of Pairs(input$_x$, [targets]) at first count level (as referred to as count level=1). In an embodiment with M count levels, the system can utilize M sets of pairings per study which can be referred to by the shorthand Pairs$_{countlevel=1 \ldots M}$(input$_x$, [targets]). as shown graphically in FIG. 2A for each of N studies and as shown textually in FIG. 2B.

Similarly, in other denoising applications, the downsampling process can be replaced by adding simulated noise to generate multiple noise realizations.

Figure 3A:
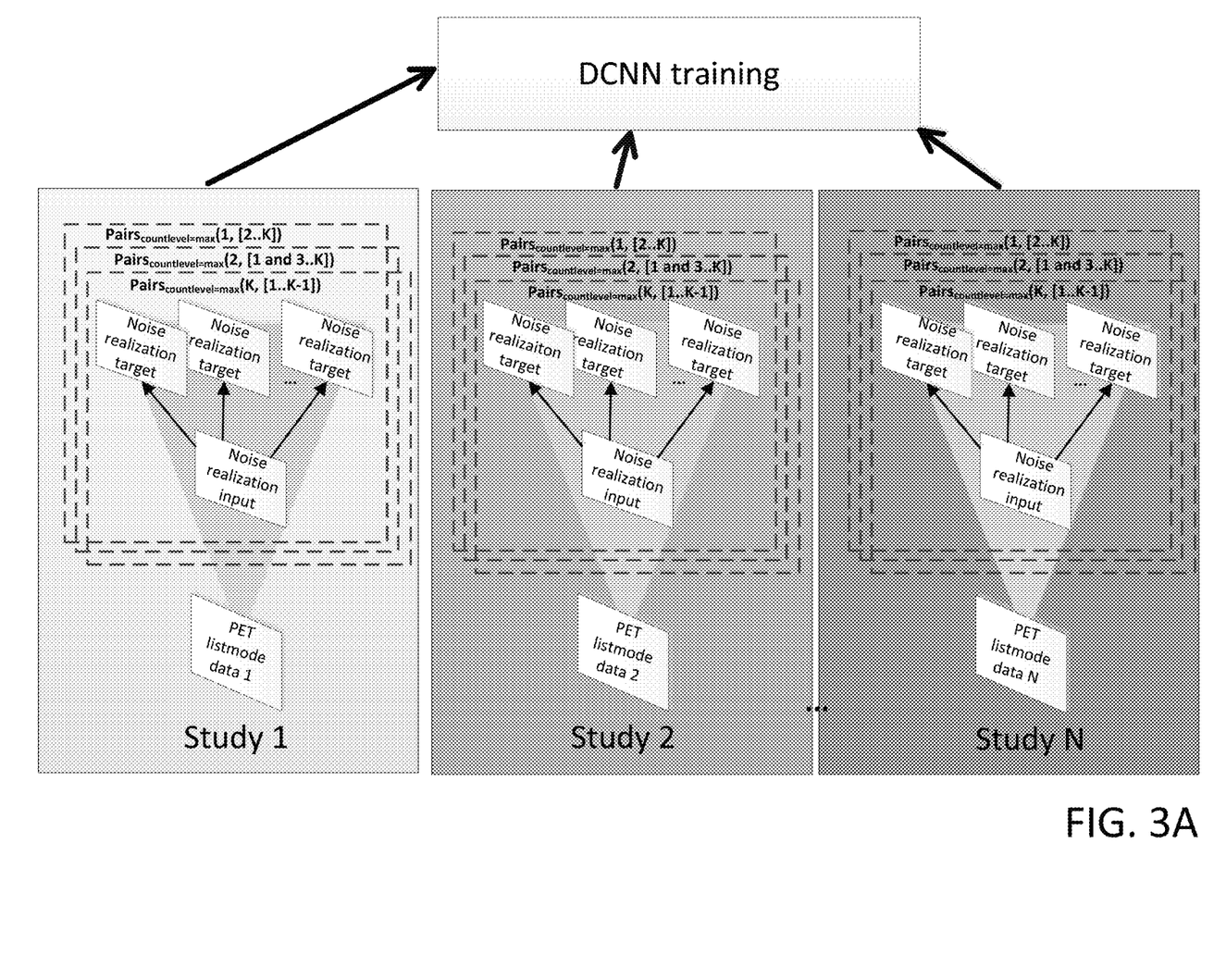
FIG. 3A shows a workflow for N2NEN training, where, for each of N studies, each noise realization is used in turn as a noisy input and target for a single, maximum count level per study.
Figure 3B:
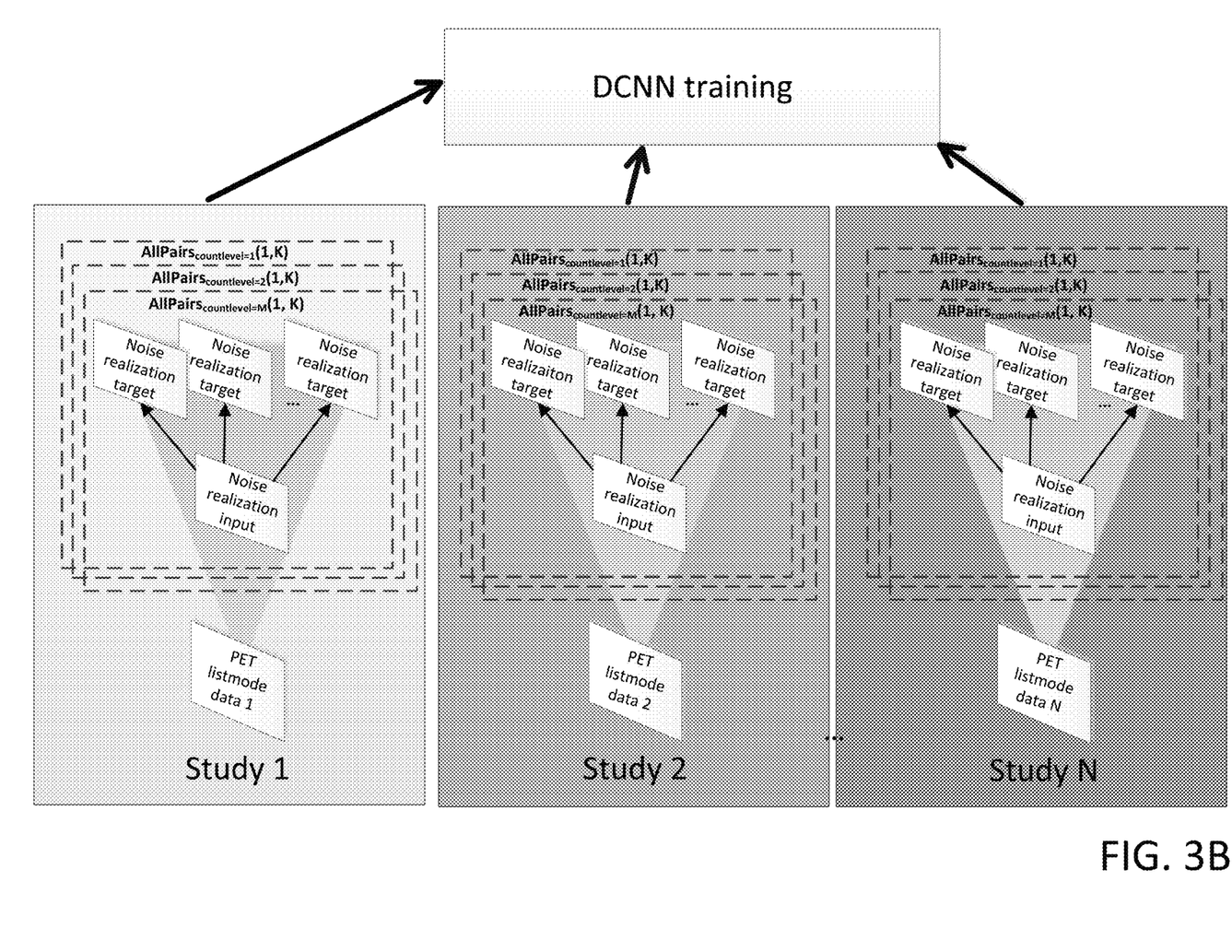
FIG. 3B shows a workflow for N2NEN training, where, for each of N studies, each noise realization is used in turn as a noisy input and target, but each study is split into plural count levels for additional network training and robustness.

In an alternate embodiment, to further increase the number of training samples, each noise realization can in turn act as a noisy input and a target. For example, as illustrated in FIG. 3A, for each Study (Study 1 through Study N), where each Study has Noise realization 1 through Noise realization K, a first Noise realization (e.g. Noise realization 1) is used as the corrupted dataset, and the rest of the noise realizations (e.g. Noise realizations 2 . . . K) are used as targets in DCNN training as would be achieved by Pairs(1, [2 . . . K]). Then, a second noise realization (e.g. Noise realization 2) is used as the corrupted dataset, and the rest of the noise realizations (e.g. Noise realization 1, and Noise realizations 3 . . . K) are used as targets as would be achieved by Pairs(2, [1, 3 . . . K]). This pattern can be repeated so that each noise realization for each Study is used as the corrupted dataset (while the rest of the noise realizations are the targets), if additional training samples are needed. That is, each of Pairs(1, [2 . . . K]) to Pairs(K, [1 . . . K−1]) can be used which can be referred to by the shorthand AllPairs(1, K).

To use existing clinical data for training retrospectively, in case the raw listmode data is not long enough to rebin into a sufficient number of multiple noise realizations, a "bootstrap" technique can be used such that each event is drawn with a certain probability of replacement, with the result that there is increased correlation between the resulting multiple noise realizations. For example, according to a "bootstrap" technique, 5-min data is rebinned into multiple count levels and training-ready noise realizations (with increasing correlation), such as 5 (noise realizations)×1-min, 5×2-min, 5×3-min, and/or 5×4-min datasets for training. This method can vastly expand the number of training datasets that can be created from existing datasets without the need for a high quality image to be used in training.

As noted above, all the studies do not have to be the same time length initially as long as they are all longer than a threshold time period that the data is paired down to for the maximum count level. For example, if there are 5 studies, and they have data that runs for 5 or more minutes (e.g., 5, 6, 5.5, 7, and 6.5 minutes), as long as the original data is rebinned into data sets less than or equal to 5 minutes (e.g., 1 minute, 2 minutes, 3 minutes, 4 minutes, and 5 minutes), all the studies can be used.

Figure 4A:
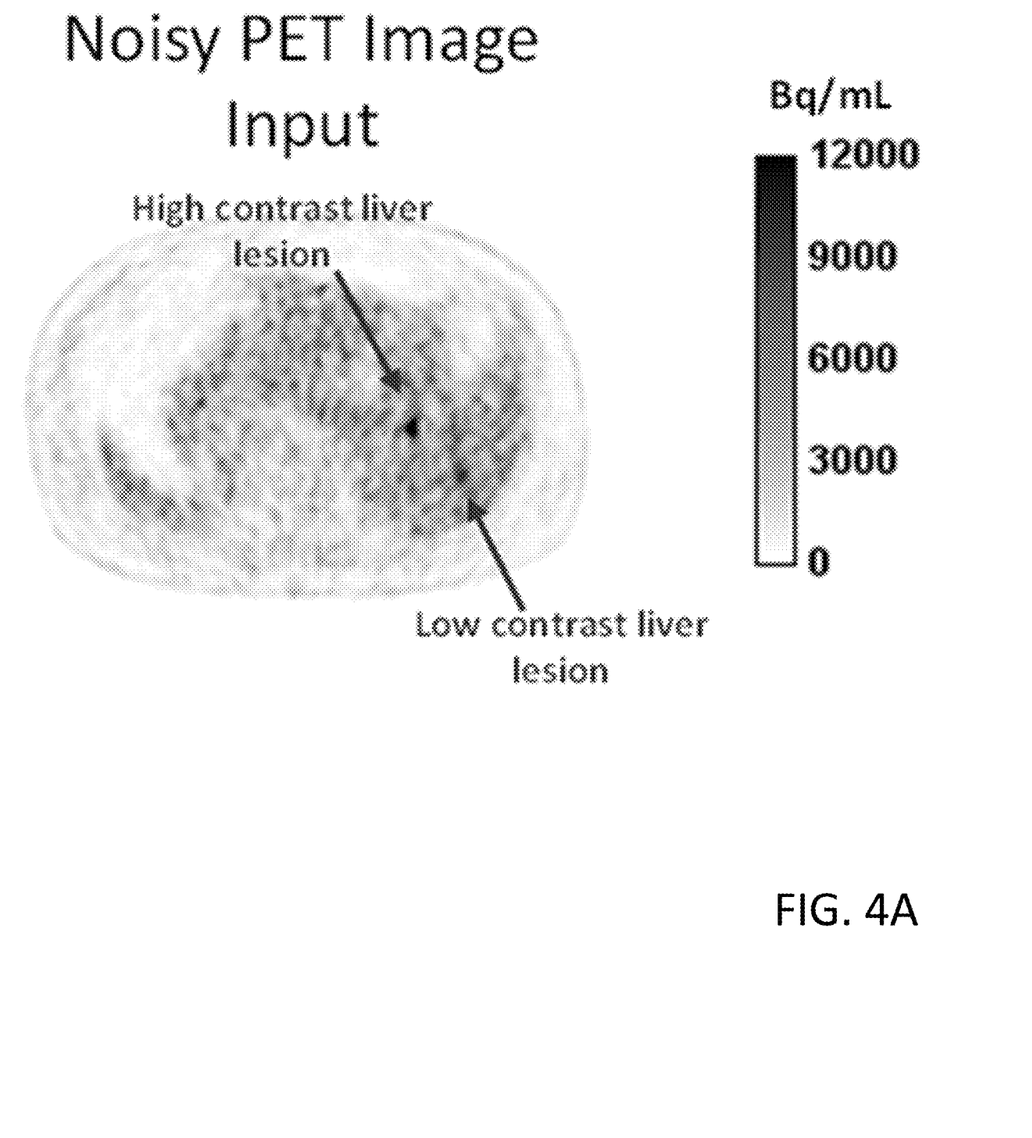
FIGS. 4A to 4C show an example of the N2NEN network applied on a real patient.
Figure 4B:
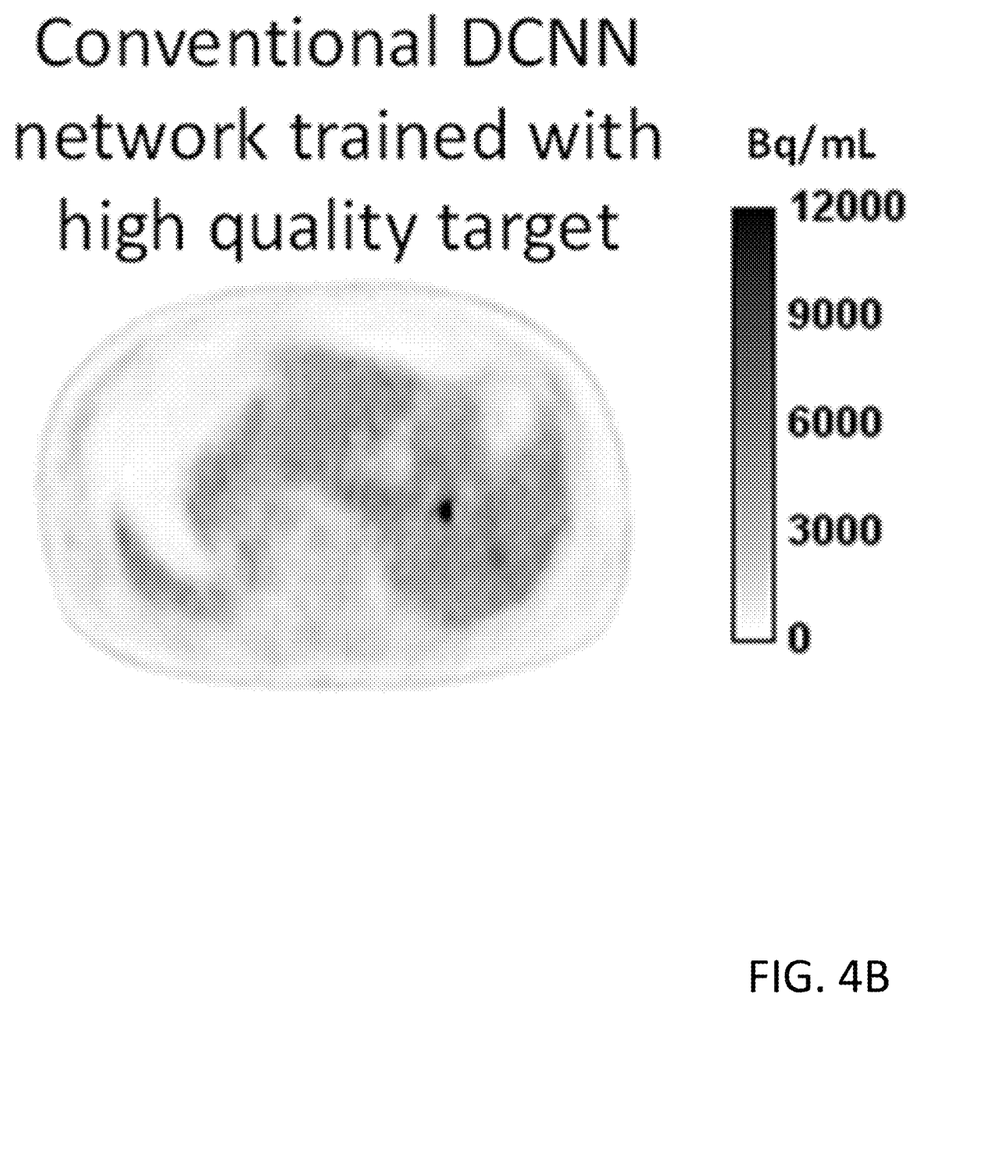
Figure 4C:
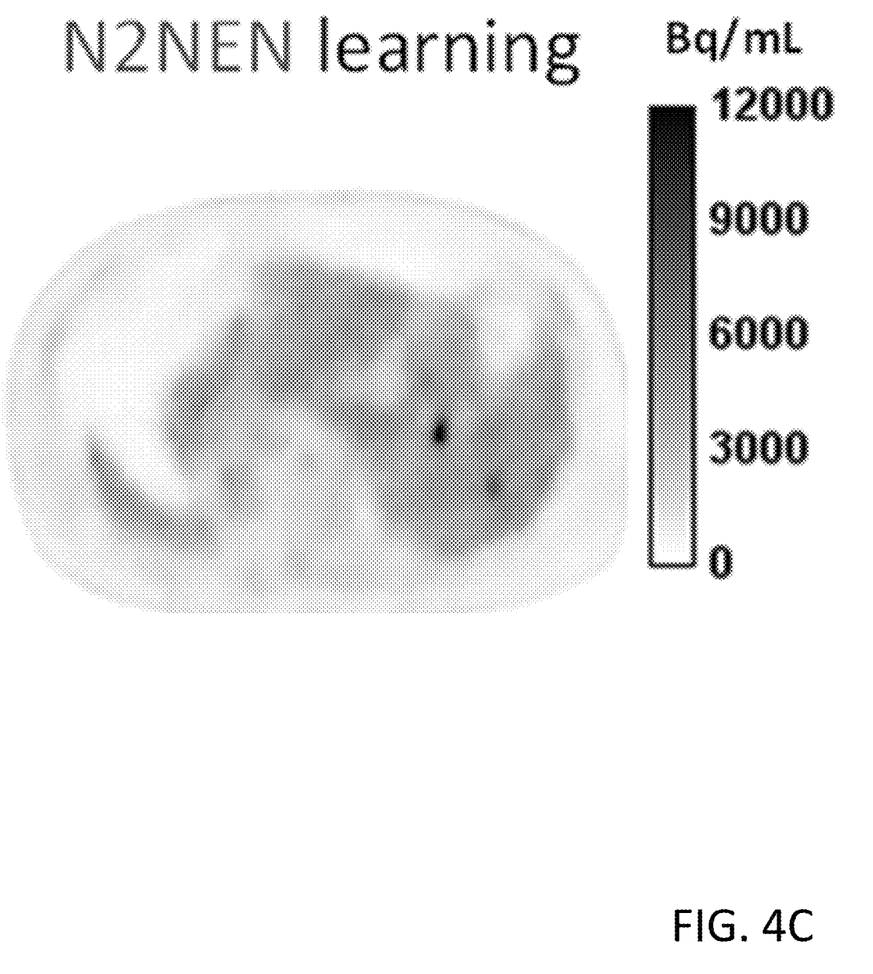

FIG. 4A, FIG. 4B, and FIG. 4C show an example of the N2NEN network applied on a real patient 18F-FDG study (2-min) inserted with 2 liver lesions at different contrast (5:1 and 3:1). FIG. 4A shows a noisy PET image acquired for 2-min as the input. FIG. 4B shows the denoised result of a DCNN trained with 8 patient studies using high quality images as targets (see [Chan 2018]). FIG. 4C shows the proposed N2NEN network that was trained by mapping 1 noise realization to another 4 noise realizations. It can be seen that the noise is suppressed effectively while both lesions are preserved using the N2NEN network.

The deep residual network architecture (see [Chan 2018]) was adopted and compared to 3 training schemes, wherein the 3 schemes were: (1) high count target training (HC target), (2) Noise2Noise (N2N) training, and (3) N2NEN training. and:

According to High count target training (HC target), High count data (14-min/bed) for 2 beds of 18F-FDG scans were used as the target. The high count listmode data was rebinned (sub-sampling) into 8 count levels ranging from 30 s to 420 s per bed as the noisy samples. The training datasets consisted of 8 such patient studies yielding 64 paired training datasets in total.

According to Noise2Noise (N2N) training, 1 patient study was used to rebin the 14-min listmode data into 3 count levels including 120 s, 168 s, and 210 s per bed. For each count level, 1 noise realization was paired with another noise realization yielding 3 training pairs in total.

According to Noise to noise ensemble (N2NEN) training, the same patient study was rebinned into 3 count levels including 120 s, 168 s, and 210 s. For each count level, 4 realizations were generated, such that 1 realization was used as noisy inputs, and 3 other noise realizations were used as targets yielding 9 training pairs.

First, the different training schemes on a validation dataset that was not included in the training were compared by rebinning the 14-min/bed listmode data into 2-min/bed to generate the low count data. Then, all the methods on another 2 testing patient studies acquired for 4-min/bed that were further rebinned into 2-min/bed were evaluated. In the testing datasets, a 10 mm liver lesion with 5:1 contrast was simulated using Geant4 Application for Tomographic Emission (GATE) with patients' attenuation maps. The simulated lesion listmode was concatenated with the patients' listmode data. All images were reconstructed with 3 iterations and 10 subsets using Ordered Subset Expectation Maximization (OSEM) Lesion contrast recovery (CR) versus liver coefficient of variation (CoV) on the inserted lesions was measured for quantitative evaluations. Gaussian filters at 4, 6, and 8 Full Width Half Maximum (FWHM) on each of the reconstructions was also applied for comparison.

Figure 5:
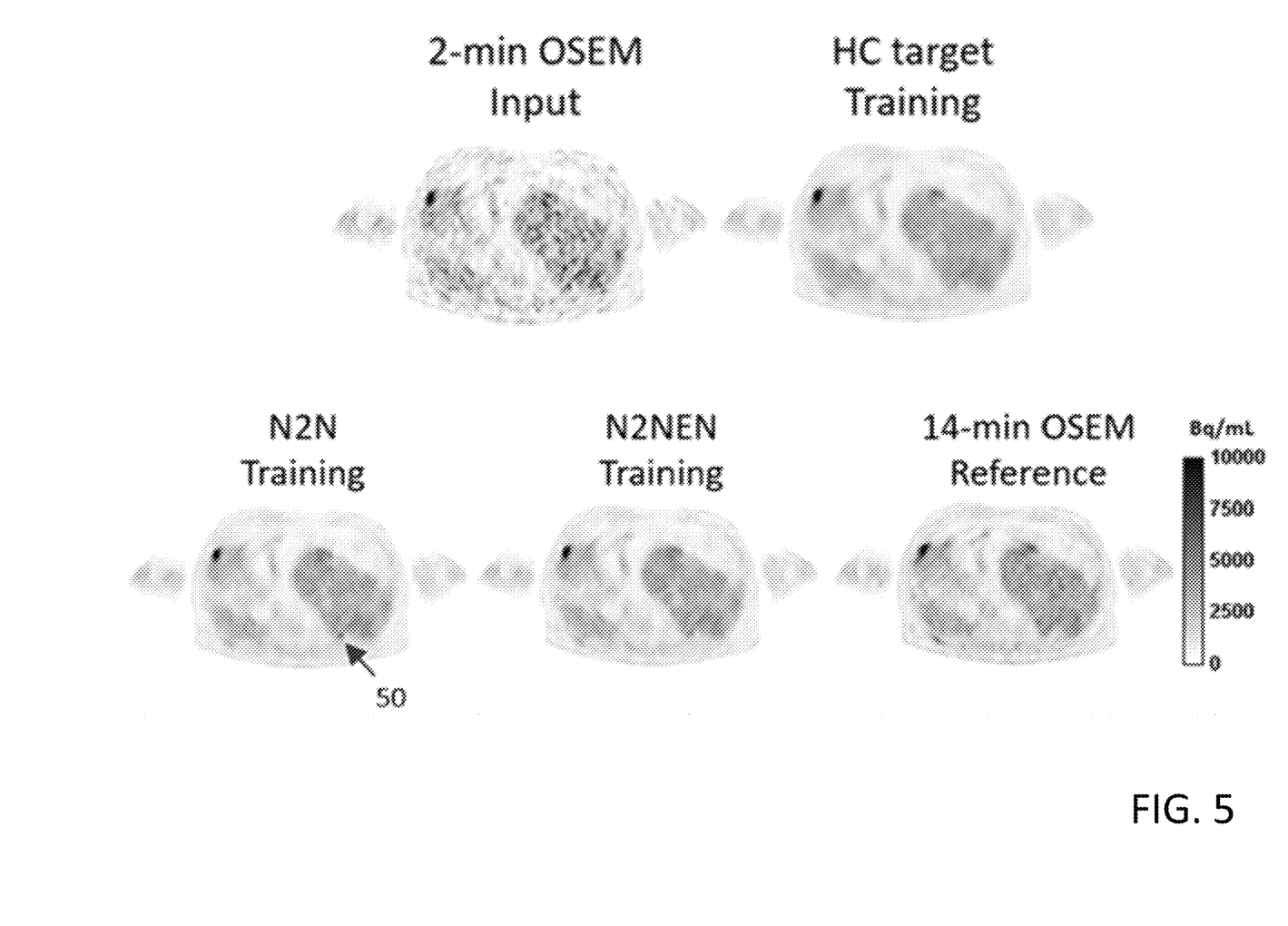
FIG. 5 shows sample trans-axial slices of a validation patient study.

FIG. 5 shows sample transaxial slices of the validation patient study. The denoised 2-min/bed images are compared to a 14-min/bed OSEM reconstruction as reference. Speckle noise 50 can be seen in the N2N result. N2NEN yielded a similar result as the HC target training with natural noise texture.

Figure 6:
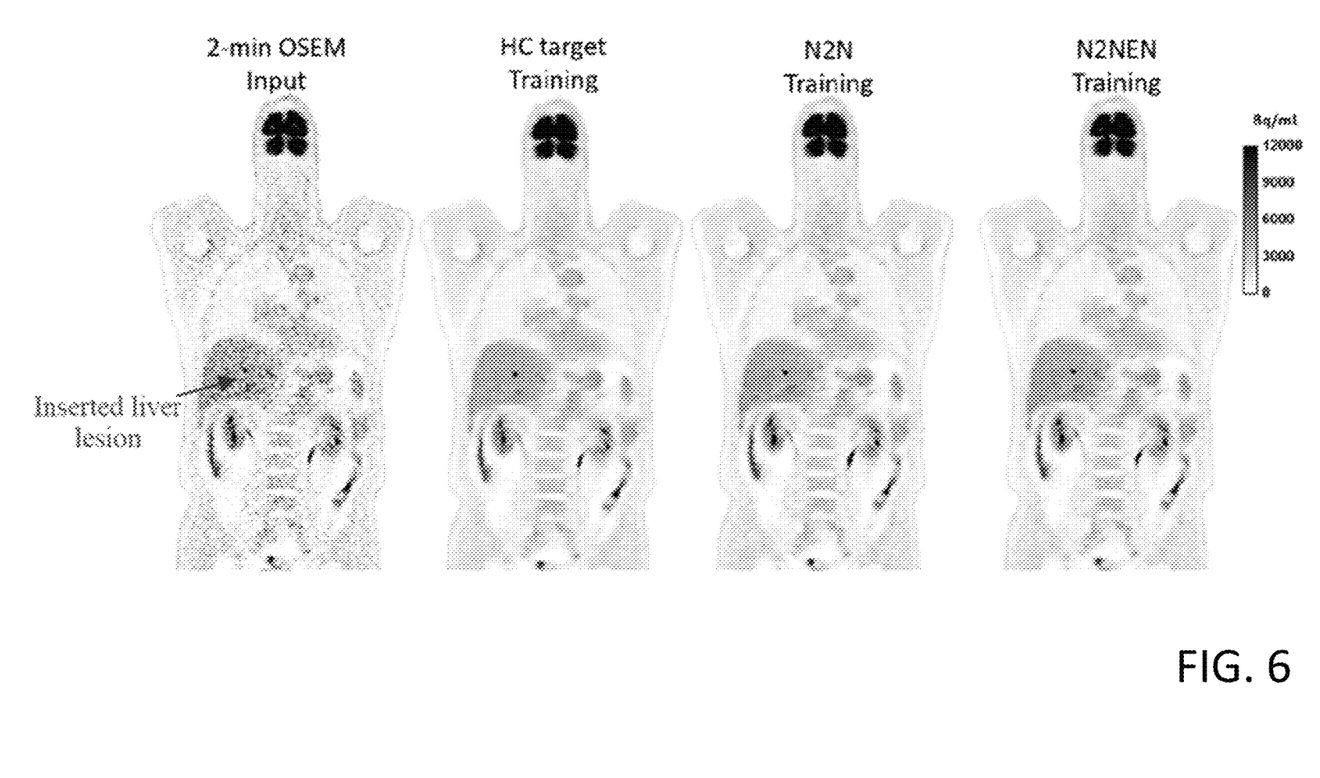
FIG. 6 shows sample trans-axial slices of a validation patient study.

FIG. 6 shows sample transaxial slices of patient study 1(2-min/bed) showing the center slice of the simulated liver lesion. N2N yielded speckle noise and distorted lesion shape, while N2NEN yielded similar results as HC target denoising.

Figure 7A:
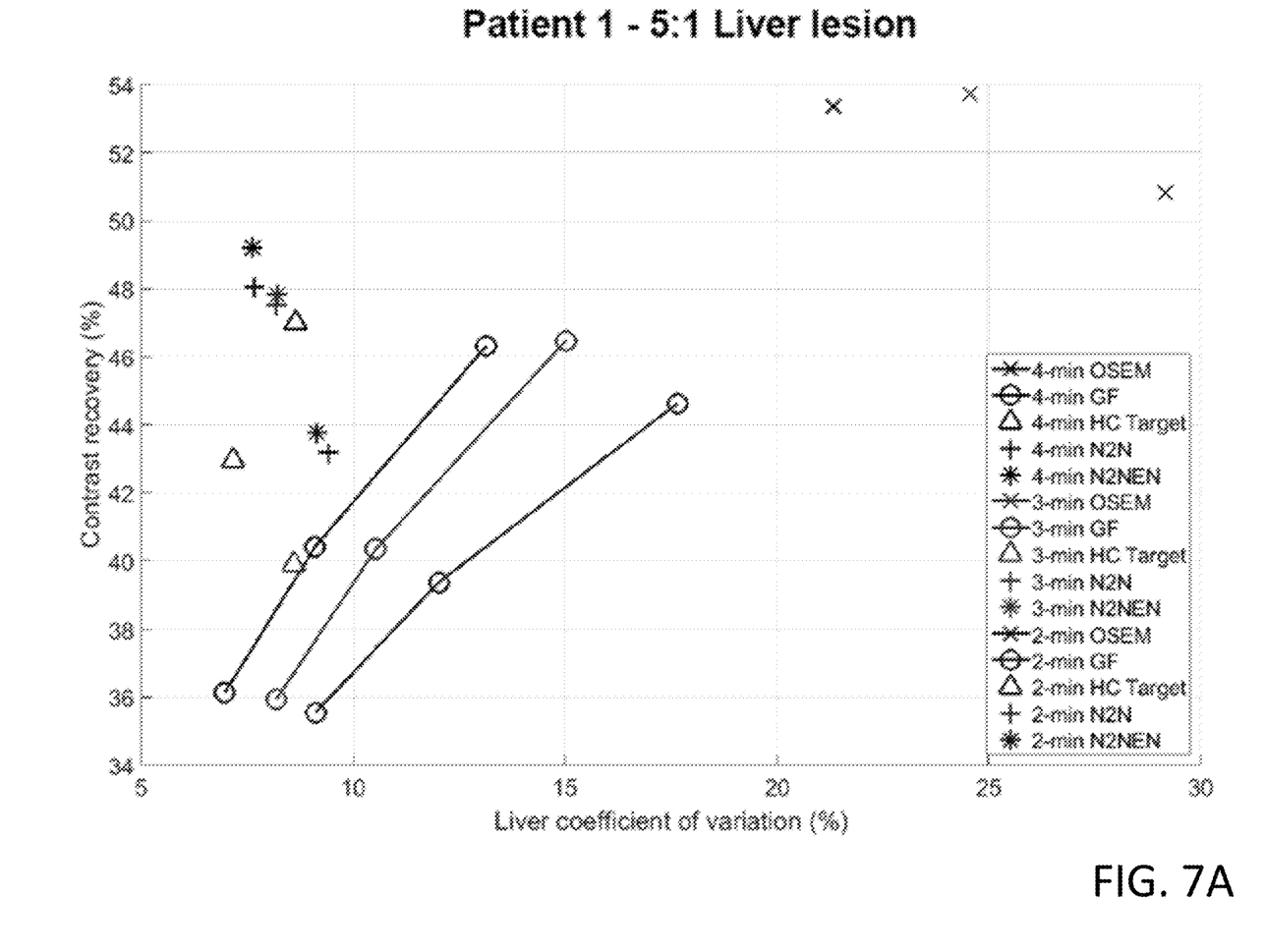
FIG. 7A shows the lesion contrast recovery (%) versus liver coefficient of variation (%) of the simulated liver lesion for a first patient.
Figure 7B:
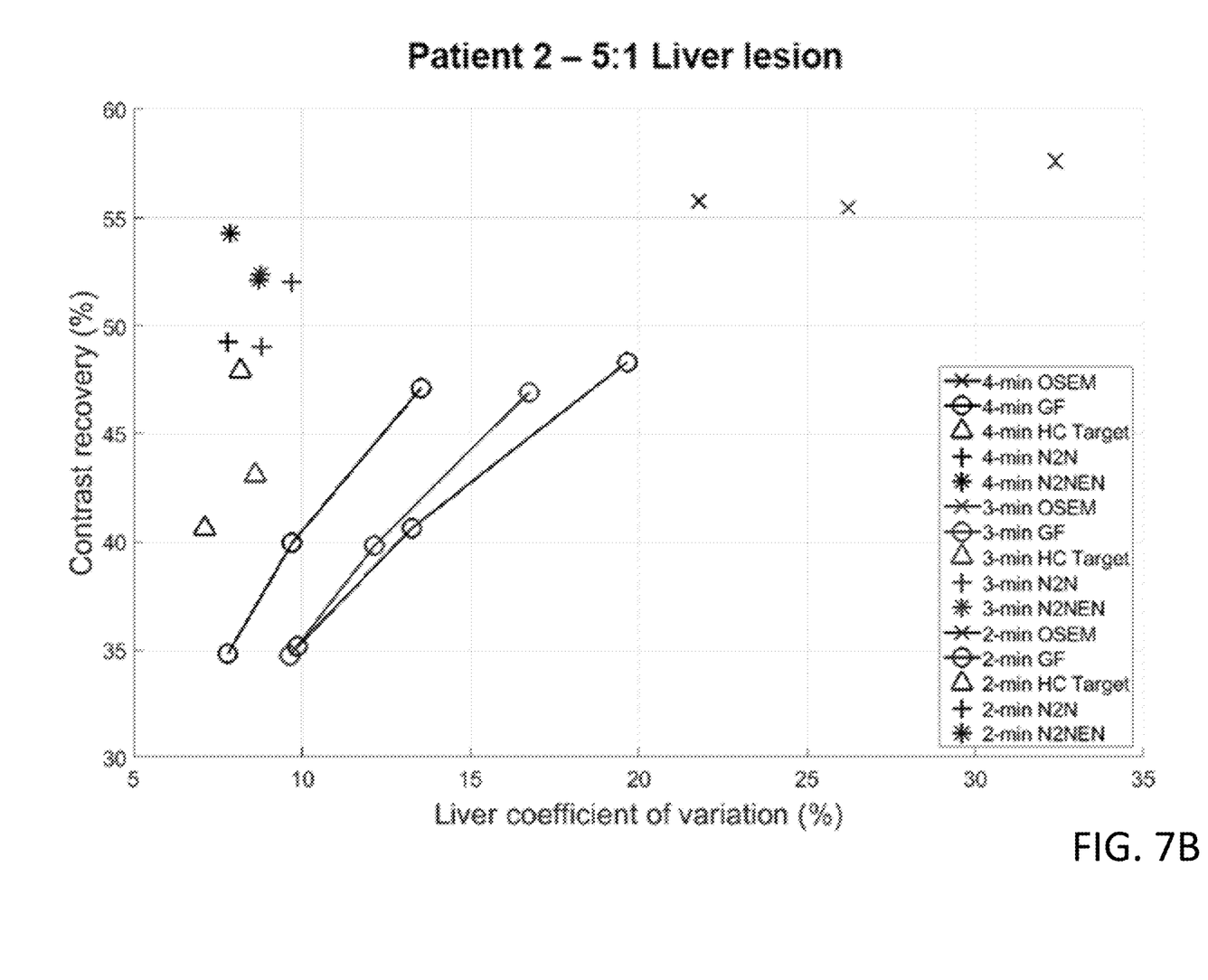
FIG. 7B shows the lesion contrast recovery (%) versus liver coefficient of variation (%) of the simulated liver lesion for a second patient.

FIG. 7A and FIG. 7B show the lesion CR vs liver CoV of the simulated liver lesion for a first patient and second patient, respectively. The curve of Gaussian Filtering (GF) was generated by varying the FWHM from 4 mm to 8 mm.

Analyzing the results, FIG. 5 showed sample transaxial slices of the validation study comparing different methods. It can be seen that although N2N denoising removed noise to some extent, there is speckle noise remaining in the denoised image, and the noise texture is clustered. In contrast, N2NEN yielded a visually smoother result than HC target denoising while maintaining the natural noise texture. Furthermore, FIG. 6 showed the sample transaxial slices of patient study 1 with the simulated liver lesion. In N2N results, speckle noise can be observed and the shape of the lesion is distorted, while HC target and N2NEN yielded similar results. FIG. 7A and FIG. 7B showed the CR vs liver CoV measurements. It can be seen that all the training methods yielded comparable liver CoV. N2NEN yielded higher lesion contrast than N2N, while HC target training yielded the best performance, which might be attributed to the significantly more datasets included in training.

The results demonstrated that N2NEN training can effectively suppress noise (e.g. in PET images) with natural noise texture even while using a single study in training, which can significantly ease the demanding task of acquiring high quality data for training.

As noted above, the procedures herein can utilize single count or multiple count levels. Furthermore, in one embodiment, the range of count levels used for training is larger than what is expected to be typically used in clinical practice.

This disclosure is directed to an image processing method and system that performs image data segmentation and utilizes an artificial neural network to remove noise from image data of later images taken under similar image conditions, and, in one embodiment, to an image processing method and system that processes N image datasets from N studies (e.g., PET scan studies) and converts the N image datasets into K datasets for each of the N studies. The K datasets are then each divided into corrupted datasets and target datasets, and an artificial neural network is trained to remove noise from images taken under similar image conditions using the corrupted datasets and target datasets.

Instead of training the neural network to predict a high quality image from a low quality input, the network is trained to map one noise realization to an ensemble of noise realizations that all share the same mean. Therefore, the neural network learns to output an average of the explanations, and thus can yield a more accurate and robust solution to capture the complicated spatially non-stationary noise distribution in PET images.

The method and system described herein can be implemented in a number of technologies but generally relate to processing circuitry for training and implementing an artificial neural network. In one embodiment, the processing circuitry is implemented as one of or as a combination of an application specific integrated circuit (ASIC), a field programmable gate array (FPGA), a generic array of logic (GAL), a programmable array of logic (PAL), circuitry for allowing one-time programmability of logic gates (e.g., using fuses) or reprogrammable logic gates. Furthermore, the processing circuitry can include a computer processor and having embedded and/or external non-volatile computer readable memory (e.g., RAM, SRAM, FRAM, PROM, EPROM, and/or EEPROM) that stores computer instructions (binary executable instructions and/or interpreted computer instructions) for controlling the computer processor to perform the processes described herein. The computer processor circuitry may implement a single processor or multiprocessors, each supporting a single thread or multiple threads and each having a single core or multiple cores. The processing circuitry used to train the artificial neural network need not be the same as the processing circuitry used to implement the trained artificial neural network that performs the image denoising described herein. For example, processor circuitry and memory may be used to produce a trained artificial neural network (e.g., as defined by its interconnections and weights), and an FPGA may be used to implement the trained artificial neural network. Moreover, the training and use of a trained artificial neural network may use a serial implementation or a parallel implementation for increased performance (e.g., by implementing the trained neural network on a parallel processor architecture such as a graphics processor architecture).

Although portions of the discussion herein have been made with respect to using datasets of medical studies (e.g., PET scan datasets), the present invention is not limited to image denoising of medical images and may be used to remove noise in other kinds of images.

The invention claimed is:

1. A method of generating an image denoising system, comprising:
   obtaining imaging data from a set of N studies;
   dividing each of the N studies into at least K training-ready noise realizations representing K subsets of the imaging data from each of the N studies; and
   training a machine learning-based system, on a study-by-study-basis for each study of the set of N studies by a noise-to-noise-ensemble (N2NEN) training method, based on (1) a first noise realization of the at least K training-ready noise realizations only as training data for each study, and (2) a remaining K−1 training-ready noise realizations of the at least K training-ready noise realizations other than the first noise realization for each study only as label data to produce a trained machine learning-based system,
   wherein the first noise realization and the remaining K−1 training-ready noise realizations contain noise.

2. The method as claimed in claim 1, further comprising repeating for at least one study of the set of N studies, training the machine learning-based system, based on (1) a second noise realization of the at least K training-ready noise realizations other than the first noise realization as training data for the at least one study and (2) a remaining K−1 training-ready noise realizations of the at least K training-ready noise realizations other than the second noise realization for the at least one study as label data to produce the trained machine learning-based system.

3. The method as claimed in claim 1, further comprising repeating on a study-by-study basis for the set of N studies, training the machine learning-based system, based on (1) a second noise realization of the at least K training-ready noise realizations other than the first noise realization as training data and (2) a remaining K−1 training-ready noise realizations of the at least K training-ready noise realizations other than the second noise realization as label data to produce the trained machine learning-based system.

4. The method as claimed in claim 1, wherein the at least K training-ready noise realizations for each study of the set of N studies are training-ready noise realizations of a first count level, the method further comprising:
   obtaining at least K training-ready noise realizations at a second count level for each study of the set of N studies; and
   training the machine learning-based system, on a study-by-study-basis for each study of the set of N studies, based on (1) a first noise realization of the at least K training-ready noise realizations at the second count level as training data for the each study and (2) a remaining K−1 training-ready noise realizations of the at least K training-ready noise realizations at the second count level other than the first noise realization at the second count level for each study as label data to produce the trained machine learning-based system.

5. The method as claimed in claim 4, further comprising repeating on a study-by-study basis for the set of N studies, training the machine learning-based system, based on (1) a second noise realization of the at least K training-ready noise realizations other than the first noise realization, but separately at the first and second count levels, as training data, and (2) a remaining K−1 training-ready noise realizations of the at least K training-ready noise realizations other than the second noise realization, but separately at the first and second count levels, as label data to produce the trained machine learning-based system.

6. The method as claimed in claim 1, wherein the machine learning-based system comprises a neural network and the trained machine learning-based system comprises a trained neural network.

7. The method as claimed in claim 6, wherein the neural network comprises a deep neural network.

8. The method of claim 1, wherein the at least K training-ready noise realizations are at least K substantially independent noise realizations.

9. A trained machine learning-based system produced according to the method of claim 1.

10. The method of claim 1, wherein N is an integer, N≥2, K is an integer, and K is greater than or equal to three so that the machine-learning system is trained on K−1 pairs of training/label data.

11. A system, comprising:
   processing circuitry configured to
      obtain imaging data from a set of N studies;
      divide each of the N studies into at least K training-ready noise realizations representing K subsets of the imaging data from each of the N studies; and
      train a machine learning-based system, on a study-by-study-basis for each study of the set of N studies by a noise-to-noise-ensemble (N2NEN) training method, based on (1) a first noise realization of the at least K training-ready noise realizations only as training data for the each study, and (2) a remaining K−1 training-ready noise realizations of the at least K training-ready noise realizations other than the first noise realization for each study only as label data to produce a trained machine learning-based system,
   wherein the first noise realization and the remaining K−1 training-ready noise realizations contain noise.

12. The system as claimed in claim 11, wherein the processing circuitry is further configured to repeat for at least one study of the set of N studies, training the machine learning-based system, based on (1) a second noise realization of the at least K training-ready noise realizations other than the first noise realization as training data for the at least one study, and (2) a remaining K−1 training-ready noise realizations of the at least K training-ready noise realizations other than the second noise realization for the at least one study as label data to produce the trained machine learning-based system.

13. The system as claimed in claim 11, wherein the processing circuitry is further configured to repeat on a study-by-study basis for the set of N studies, training the machine learning-based system, based on (1) a second noise realization of the at least K training-ready noise realizations other than the first noise realization as training data, and (2) a remaining K−1 training-ready noise realizations of the at least K training-ready noise realizations other than the second noise realization as label data to produce the trained machine learning-based system.

14. The system as claimed in claim 11, wherein the at least K training-ready noise realizations for each study of the set of N studies are training-ready noise realizations of a first count level, and the processing circuitry is further configured to:
   obtain at least K training-ready noise realizations at a second count level for each study of the set of N studies; and train the machine learning-based system, on a study-by-study-basis for each study of the set of N studies, based on (1) a first noise realization of the at least K training-ready noise realizations at the second count level as training data for the each study, and (2) a remaining K−1 training-ready noise realizations of the at least K training-ready noise realizations at the second count level other than the first noise realization at the second count level for each study as label data to produce the trained machine learning-based system.

15. The system as claimed in claim 14, wherein the processing circuitry is further configured to repeat on a study-by-study basis for the set of N studies, training the machine learning-based system, based on (1) a second noise realization of the at least K training-ready noise realizations other than the first noise realization, but separately at the first and second count levels, as training data, and (2) a remaining K−1 training-ready noise realizations of the at least K training-ready noise realizations other than the second noise realization, but separately at the first and second count levels, as label data to produce the trained machine learning-based system.

16. The system as claimed in claim 11, wherein the machine learning-based system comprises a neural network and the trained machine learning-based system comprises a trained neural network.

17. The system as claimed in claim 16, wherein the neural network comprises a deep neural network.

18. A trained machine learning-based system produced using the system according to claim 11.

* * * * *